(12) United States Patent
Wakui (10) Patent No.: US 6,924,837 B2
(45) Date of Patent: Aug. 2, 2005

(54) DIGITAL CAMERA WITH ATTITUDE AND SHAKE DETECTION

(75) Inventor: Yoshio Wakui, Saitama (JP)

(73) Assignee: PENTAX Corporation, Tokyo (JP)

( * ) Notice: Subject to any disclaimer, the term of this patent is extended or adjusted under 35 U.S.C. 154(b) by 846 days.

(21) Appl. No.: 09/774,607

(22) Filed: Feb. 1, 2001

(65) Prior Publication Data

US 2001/0010544 A1 Aug. 2, 2001

(30) Foreign Application Priority Data

Feb. 1, 2000 (JP) .................................... P2000-023522

(51) Int. Cl.$^7$ ............................................ H04N 5/228
(52) U.S. Cl. ............................. 348/208.99; 348/208.1; 348/208.2; 348/231.3
(58) Field of Search ......................... 348/208.1, 208.12, 348/208.16, 208.2, 208.4, 208.99, 296, 362, 363, 364

(56) References Cited

U.S. PATENT DOCUMENTS

| | | | | |
|---|---|---|---|---|
| 4,856,882 A | * | 8/1989 | Oshima et al. ............. | 359/554 |
| 5,030,984 A | * | 7/1991 | Buckler et al. ............. | 396/153 |
| 5,210,559 A | * | 5/1993 | Ohki .......................... | 396/55 |
| 5,266,981 A | * | 11/1993 | Hamada et al. ............. | 396/55 |
| 5,576,759 A | * | 11/1996 | Kawamura et al. ..... | 348/207.99 |
| 5,587,737 A | * | 12/1996 | Sekine et al. ............. | 348/208.8 |
| 5,592,251 A | * | 1/1997 | Kai ............................. | 396/55 |
| 5,748,995 A | * | 5/1998 | Kitagawa et al. ............. | 396/55 |
| 5,900,909 A | * | 5/1999 | Parulski et al. .......... | 348/231.6 |
| 6,222,995 B1 | * | 4/2001 | Uchida .......................... | 396/6 |
| 6,687,458 B2 | * | 2/2004 | Masuda ....................... | 396/55 |

* cited by examiner

*Primary Examiner*—Tuan Ho
*Assistant Examiner*—Gevell Selby
(74) *Attorney, Agent, or Firm*—Greenblum & Bernstein, P.L.C.

(57) ABSTRACT

A digital camera with an anti-blur function is provided with simple structures. The digital camera comprises an automatic exposure control mechanism for an automatic exposure mode and inclinometer. As sub-modes, the automatic exposure mode comprises a normal program mode and a high-shutter-speed priority program mode. Output of the inclinometer is repeatedly checked at a predetermined period to detect camera-shake. Camera-shake is determined by stable or unstable output from the inclinometer. When the output is unstable, it is determined that camera-shake exists, and the high-shutter-speed priority program mode is selected. Contrarily, when it is stable, it is determined that no camera-shake exists, and the normal program mode is selected. Attitude of the camera, which is sensed by the inclinometer, is recorded to a detachable PC card with the image data when camera-shake is not detected. If camera-shake is detected, the sensed attitude data is invalidated.

5 Claims, 12 Drawing Sheets

FIG. 17
Prior Art

DIGITAL CAMERA WITH ATTITUDE AND SHAKE DETECTION

BACKGROUND OF THE INVENTION

1. Field of the Invention

The present invention relates to a digital camera.

2. Description of the Related Art

In a digital camera that is capable of recording an image and reproducing a recorded image, a camera is known that detects an attitude of the camera body from the vertical (which may be classified as the lateral (see FIG. 17) and longitudinal (see FIG. 16) positions of the camera body). In a recording mode, the above digital camera includes attitude information about the camera body with the image data. In the playback mode the recorded image may be reproduced and displayed on a monitor of the camera in a direction suitable for watching as a playback image. Namely, the topside of the monitor and the top side of the playback image (original subject image) are made almost identical.

SUMMARY OF THE INVENTION

An object of the present invention is to provide a digital camera with a simple structure which includes an inclinometer to sense camera body attitude from the vertical and is able to prevent blurring induced by camera-shake.

According to the present invention, a digital camera is provided with an anti-blur function. The digital camera comprises an automatic exposure control mechanism, a camera attitude sensing processor, a camera-shake detecting processor and a selecting control processor.

The automatic exposure control mechanism is performed in an automatic exposure mode. The automatic exposure mode comprises at least two sub-modes, such as a normal program mode and high-shutter-speed priority program mode. The high-shutter-speed priority program mode selects higher shutter speeds when compared to the normal program mode under the same photographing conditions. The camera attitude sensing processor senses an attitude of the camera from the vertical. The camera-shake detecting processor detects camera-shake in accordance with stability of the camera attitude. While the automatic exposure mode is performed, the selecting control processor selects the high-shutter-speed priority program mode when the attitude of the camera is unstable, and camera-shake is detected by the camera-shake detecting processor. On the other hand, while the automatic exposure mode is selected, the selecting control processor may select the normal program mode when attitude of the camera is stable and no camera-shake is detected.

The digital camera preferably comprises a recording processor. Together with image data of a photographed image, the recording processor records attitude information in a recording medium, which corresponds to the attitude of the camera when the photograph is taken. While the automatic exposure mode is performed, the selecting control processor invalidates the attitude information when the attitude of the camera is unstable, and camera-shake is detected by the camera-shake detecting processor.

Further, while the automatic exposure mode is performed, the selecting control processor may switch selection of the sub-mode from the high-shutter-speed priority program mode to the normal program mode when the status of attitude sensed by the camera attitude sensing processor changes from unstable to stable, and no further camera-shake is detected.

Preferably, the camera attitude sensing processor comprises an inclinometer and the selecting control processor repeatedly checks output from the inclinometer at a predetermined period. If the output which corresponds to the attitude of the camera is unstable while the automatic exposure mode is performed, the attitude infomation is invalidated.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to embodiments shown in the drawings.

Figure 3:
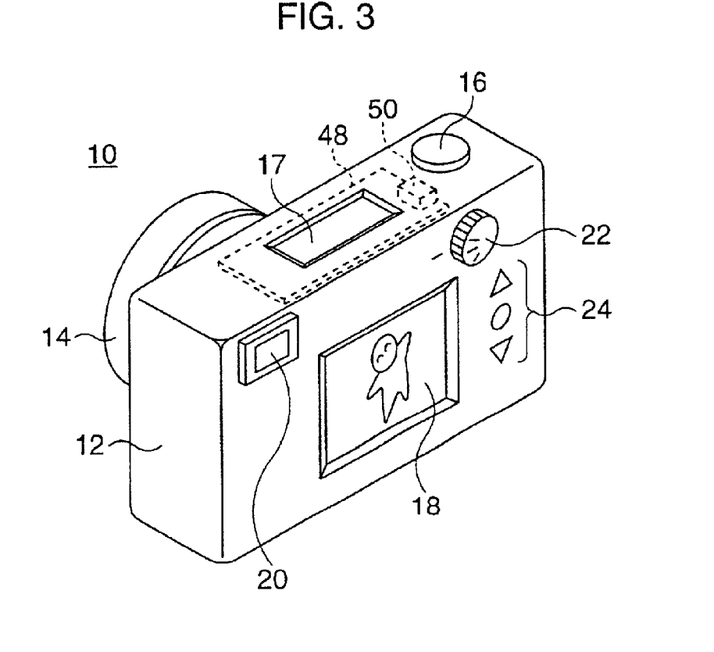
FIG. 3 is a perspective view from the backside of the digital camera.

FIG. 3 is a perspective view of a digital camera of the present embodiment, which is applied to the present invention. A photographing lens 14 is provided on a front side of a camera body 12 of the digital camera 10, and on the upper surface of the camera body 12 is a release button 16 and an LCD panel 17. On the LCD panel 17, various information concerning the operational status of the camera, photographing, and so on, are indicated.

Further, a laterally long rectangular LCD monitor 18 is provided for the digital camera 10, on about the center of the backside of the camera body 12. The LCD monitor 18 is a color display monitor. In the recording mode, live video of a subject to be monitored through the photographing lens 14 is displayed on the LCD monitor 18. In the playback mode a captured image is displayed on the LCD monitor 18.

Furthermore, on the backside of the camera body 12, disposed around the LCD monitor 18, a viewfinder 20, mode dial 22 and function buttons 24, are provided. When a power switch (not shown) of the digital camera 10 is in 'ON' state, the recording mode and playback mode can be selected by revolving the mode dial 22.

Figure 2:
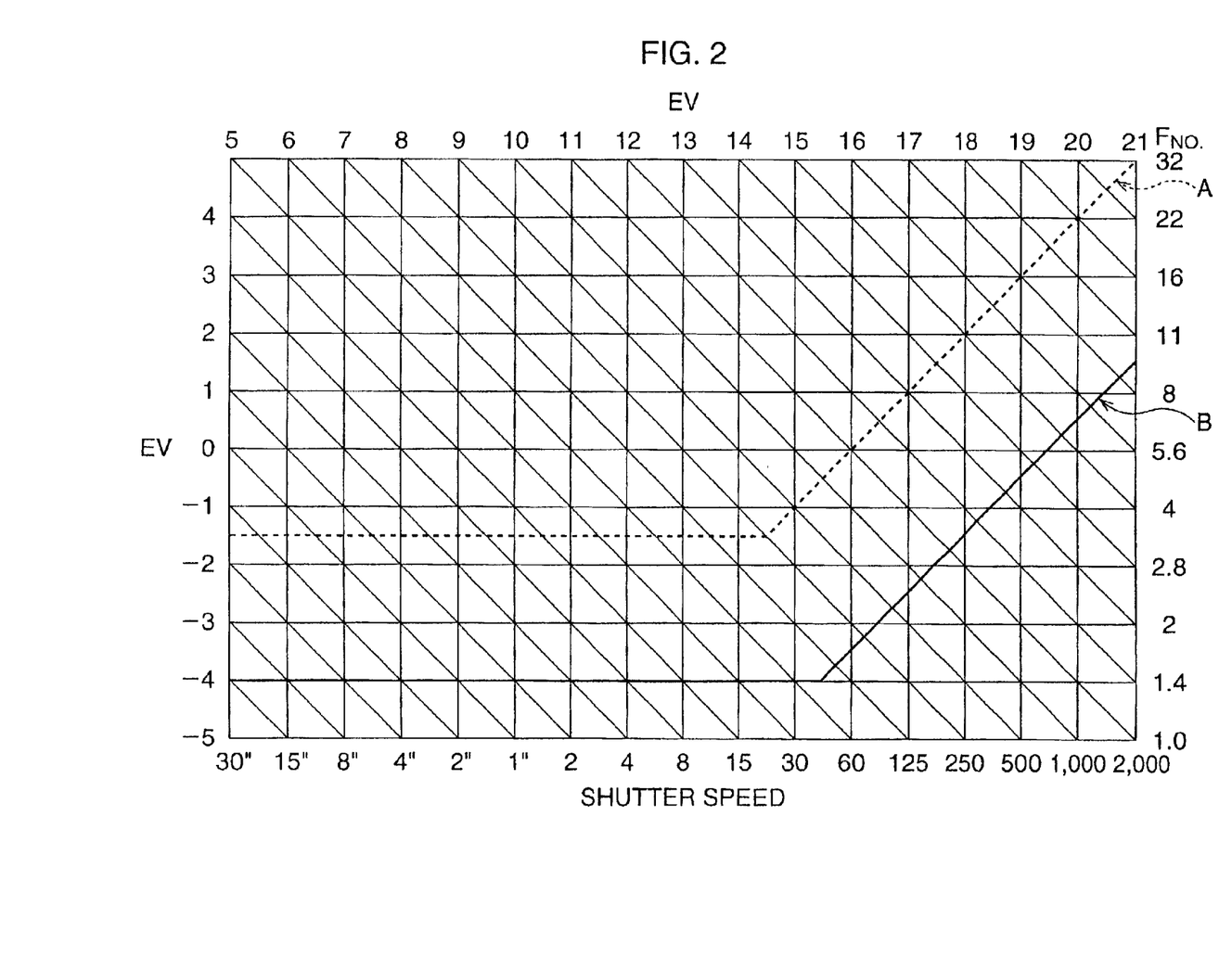
FIG. 2 is an Automatic Exposure (AE) chart representing the program of an automatic exposure mode of the digital camera.

An AE (automatic exposure) control mechanism is mounted on the digital camera 10, and by operating the function buttons 24, either a manual exposure mode or AE (automatic exposure) mode can be selected. As sub-modes of the AE mode, either a normal program mode (normal automatic exposure type) or high-shutter-speed priority program mode (high shutter speed priority automatic exposure type) can be selected. In the high-shutter-speed priority program mode, a relatively fast shutter speed is automatically selected, compared to the shutter speed selected in the normal program mode with the same conditions. FIG. 2 is a programmed AE chart of the AE mode. A broken line A indicates a programmed AE line for the normal program mode, and a solid line B indicates the line for the high-shutter-speed priority program mode.

An inclinometer 50 (refer FIGS. 4-8) is provided for the digital camera 10 to sense an attitude of the camera body 12 against the vertical, which may correspond to a lateral or longitudinal position of the camera body 10. In the recording mode of the digital camera 10, attitude information of the camera body 12, sensed by the inclinometer 50 during a photographing operation, is recorded along with the image data to a memory in an IC card, such as a PC card 39. In the playback mode, the playback image is displayed on the LCD monitor 18 in accordance with the attitude information, which is recorded in the memory, so that the topside of the playback image and the camera body 12 are parallel.

Figure 16:
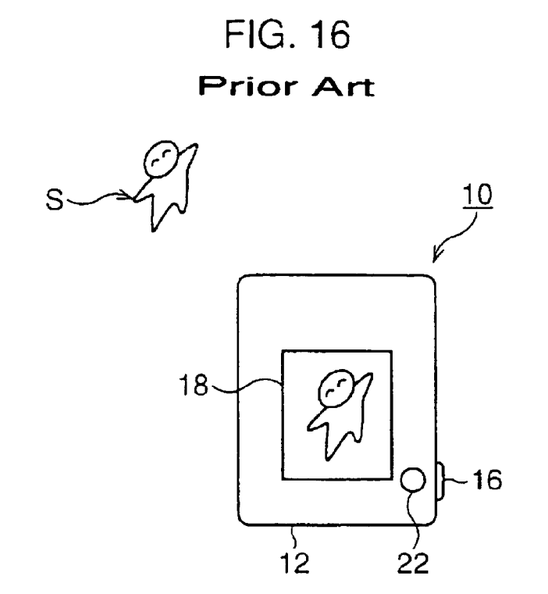
FIG. 16 illustrates a photographing operation with the digital camera disposed in a longitudinal position.
Figure 17:
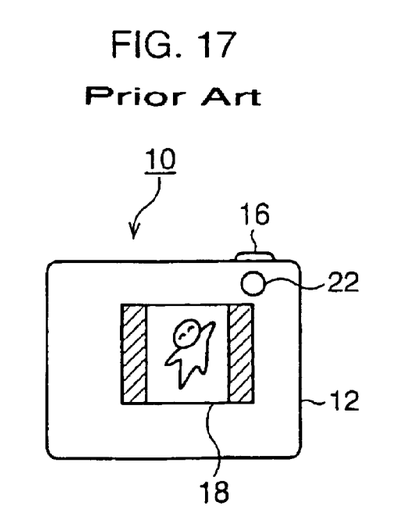
FIG. 17 illustrates the digital camera disposed in the regular or lateral position, and displaying a reproduced image that was photographed in the longitudinal position of FIG. 16, on a monitor mounted on the digital camera.

For example, when a subject S is photographed with the camera body 12 held in the longitudinal position, as shown in FIG. 16, and the image data obtained by the above is reproduced in the playback mode, the image of the subject S is displayed on the LCD monitor 18 in such manner that the topside of the image and the substantial topside of the camera body 12 are substantially identical, as shown in FIG. 17.

Figure 1:
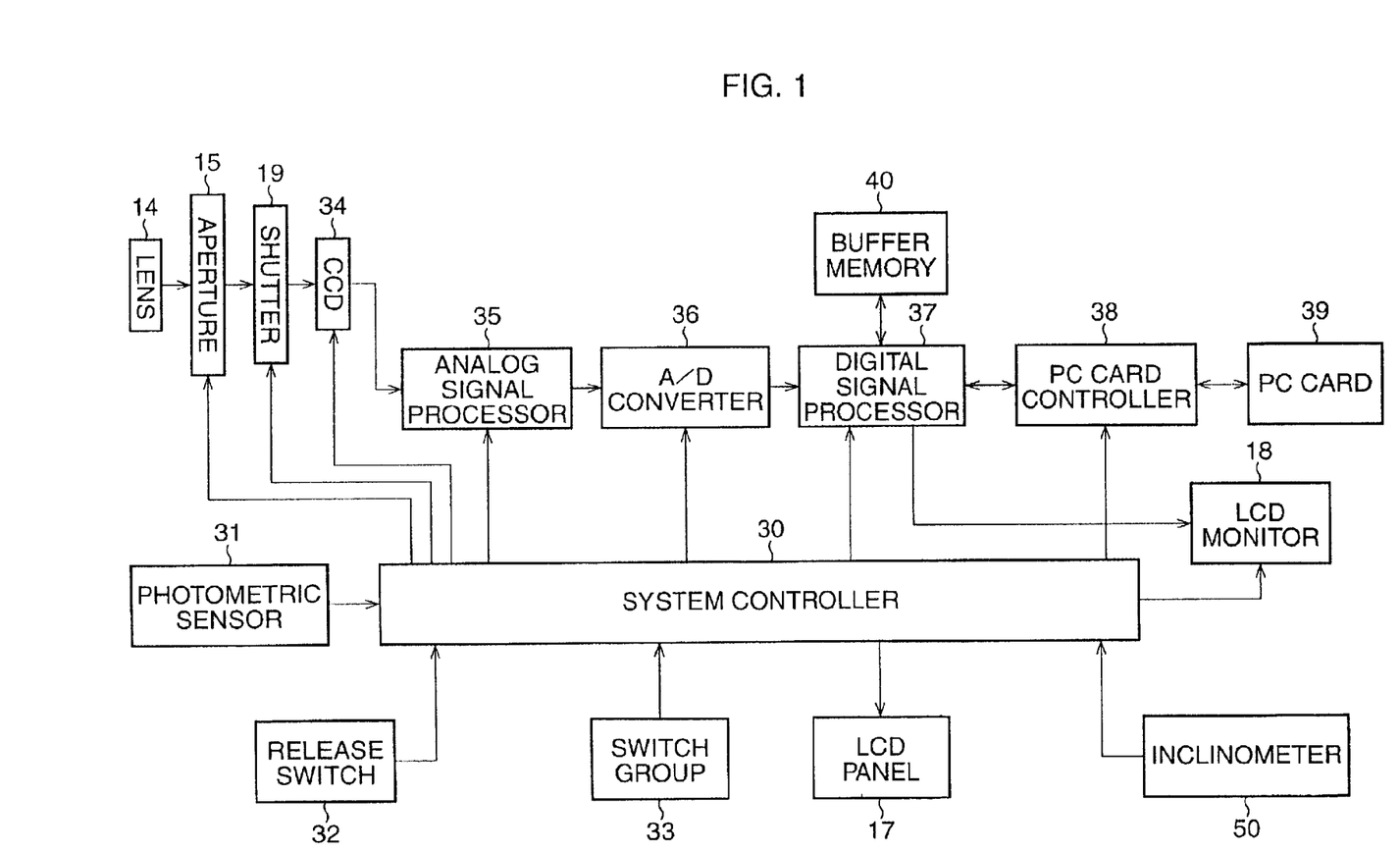
FIG. 1 is an electric schematic of a digital camera of an embodiment to which the present invention is applied.

FIG. 1 is an electrical schematic of the digital camera 10. A system controller 30 which comprises a microcomputer, is provided to the digital camera 10, and generally controls the digital camera 10. A photometric sensor 31, release switch 32 connected with the release button 16, switch group 33 including switches connected with the function buttons 24, the LCD panel 17, LCD monitor 18 and inclinometer 50 are connected to the system controller 30. Further, an aperture 15, shutter 19, CCD 34, analog signal processor 35, A/D converter 36, digital signal processor 37 and PC card controller 38 are connected to the system controller 30.

When the release button 16 is depressed, the system controller 30 derives the subject brightness via the photometric sensor 31. At this moment, a subject image formed on the surface of the CCD 34, through the photographing lens 14, is converted to electrical signals by the CCD 34. The electrical signals are then digitalized via the analog signal processor 35 and the A/D converter 36, and input to the digital signal processor 37. In the digital processor 37, a predetermined process is applied to the digitalized signals and image data is generated. This image data is recorded to the PC card 39, which has a built-in non-volatile memory, such as a flash memory (recording medium), for example.

The PC card 39 is connected with the digital processor 37 via the PC card controller 38. The digital processor 37 can record image data of a captured image to the PC card 39 via the PC card controller 38. Further, the digital processor 37 can transfer image data recorded in the PC card 39 to the buffer memory 40 via the PC card controller 38.

In the playback mode, image data is transferred from the PC card 39 to the buffer memory 40 via the digital signal processor 37. In the recording mode, monitoring video (moving video) of the subject image formed on the surface of the CCD 34 is input to the digital signal processor 37 from the A/D converter 36. The image data in each of the recording and playback mode, are output to the LCD monitor 18, and displayed on the LCD monitor as playback images.

A description of the inclinometer 50, which senses the attitude of the camera body 12 is given as follows with reference to FIGS. 4 through 8. The inclinometer 50 is fixed on a printed circuit board 48 (refer FIG. 3) disposed inside the camera body 12, so that top, bottom, right and left side in each figure (FIG. 4 to FIG. 8) correspond to those of the camera body 12 described in FIG. 3. A first conductive element 51, second conductive element 52, third conductive element 53 and fourth conductive element 54 are arranged in the inclinometer 50, as shown in each of FIGS. 4 to 8. A conductive bulb or a metallic ball 55 which is at least has a surface comprised of conductive material, is provided inside the space surrounded by the first through fourth conductive elements. Each conductive element 51–54 is connected to the system controller 30.

Figure 8:
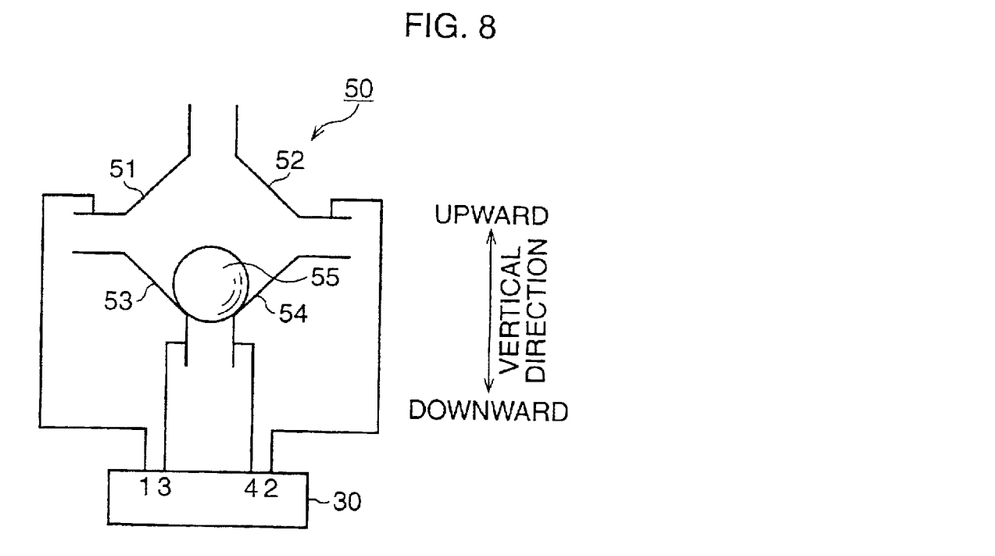
FIG. 8 illustrates the structure of the inclinometer mounted on the digital camera of the present embodiment by indicating an inside state of the inclinometer when the digital camera is disposed in the regular or lateral position.

When the digital camera 10 is disposed in the lateral position (as shown in FIG. 17), which is a regular position, the metallic ball 55 is settled in the position shown in FIG. 8. As a result, the third conductive element 53 and the fourth conductive element 54 are electrically connected together. When the digital camera 10 is disposed in the first longitudinal position (which is achieved by rotating the camera body 12, 90 degrees clockwise around the optical axis of the photographing lens from the regular or lateral position, as shown in FIG. 16), the metallic ball 55 is settled in the position shown in FIG. 6. As a result, the second conductive element 52 and the fourth conductive element 54 are electrically connected together.

Figure 4:
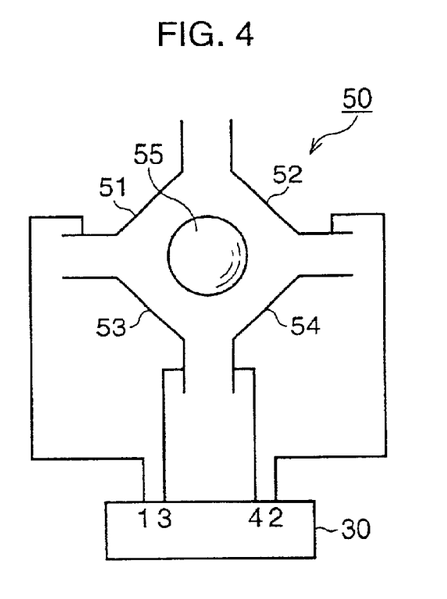
FIG. 4 illustrates a structure of an inclinometer mounted on the digital camera of the present embodiment by indicating an inside state of the inclinometer when a photographing lens of the digital camera is trained vertically upward or downward.
Figure 5:
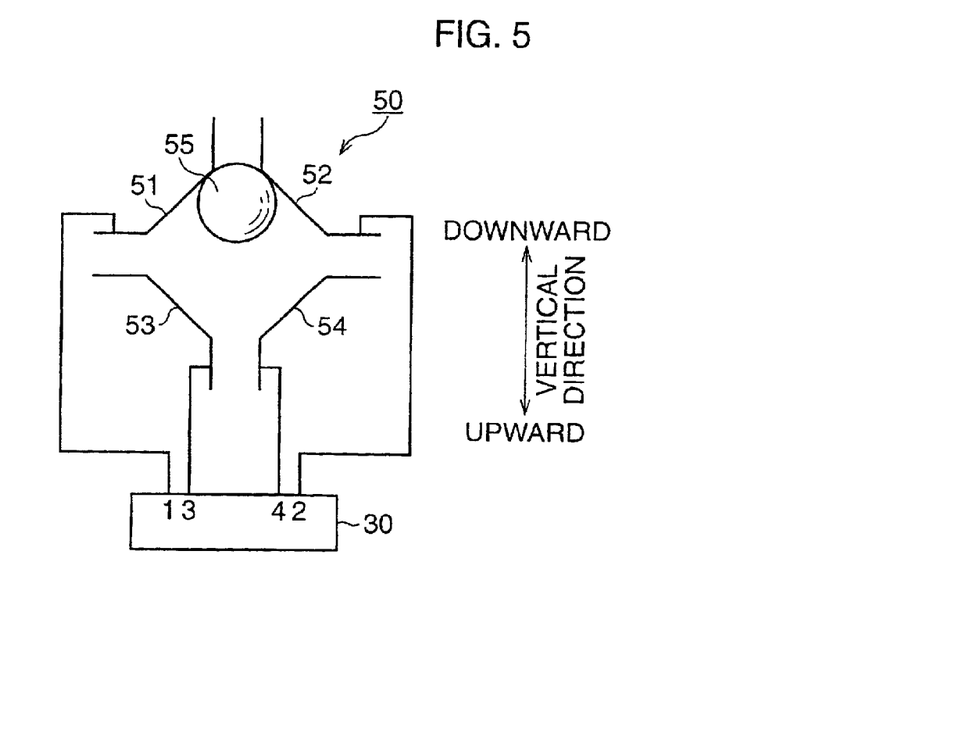
FIG. 5 illustrates the structure of the inclinometer mounted on the digital camera of the present embodiment by indicating an inside state of the inclinometer when the digital camera is disposed in the upside-down position.
Figure 6:
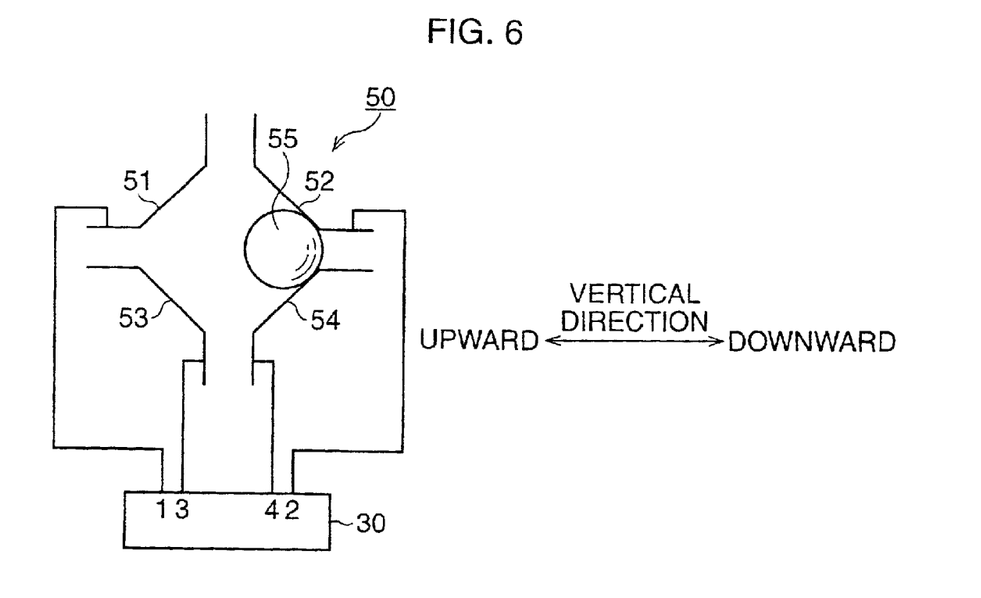
FIG. 6 illustrates structure of the inclinometer mounted on the digital camera of the present embodiment by indicating an inside state of the inclinometer when the digital camera is disposed in the first longitudinal position.
Figure 7:
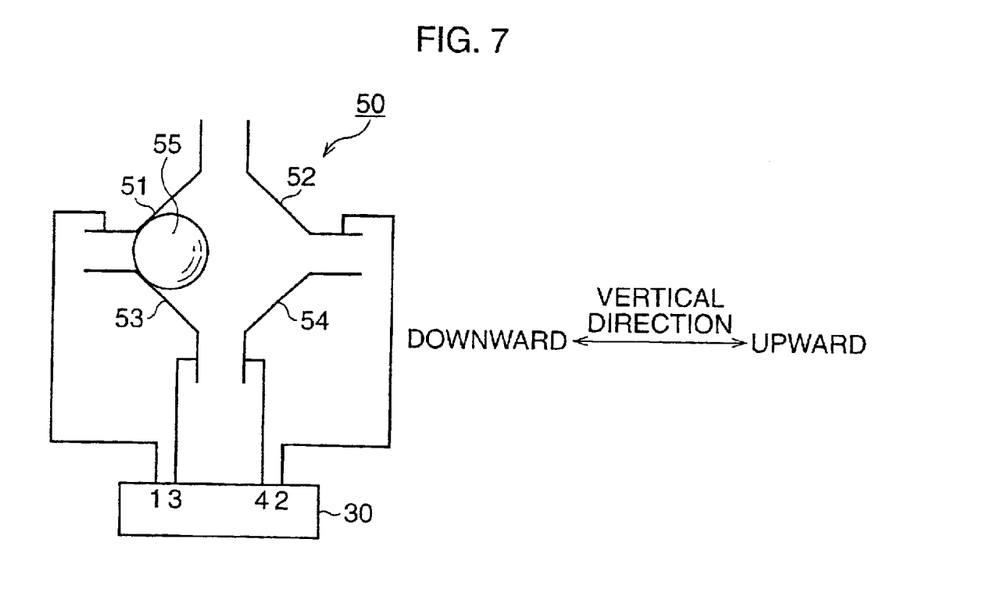
FIG. 7 illustrates the structure of the inclinometer mounted on the digital camera of the present embodiment by indicating an inside state of the inclinometer when the digital camera is disposed in the second longitudinal position.

When the digital camera 10 is disposed in the second longitudinal position (which is achieved by rotating the camera body 12, 90 degrees counterclockwise around the optical axis of the photographing lens from the lateral position), the metallic ball 55 is settled in the position shown in FIG. 7. As a result, the first conductive element 51 and the third conductive element 53 are electrically connected together. When the digital camera 10 is disposed in the upside-down position which is contrary to the above regular lateral position, the metallic ball 55 is settled in the position shown in FIG. 5. As a result, the first conductive element 51 and the second conductive element 52 are electrically connected together. Further, when the photographing lens 14 of the digital camera 10 is trained vertically up or down, the metallic ball 55 settles in a neutral position where the metallic ball 55 is apart from all the conductive elements as shown in FIG. 4. As a result, none of the conductive elements 51-54 are electrically connected.

Figure 9:
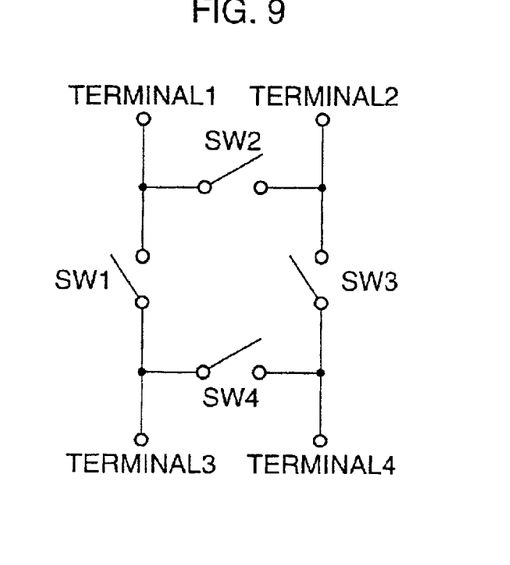
FIG. 9 illustrates electrical structure of switches in the inclinometer, which are comprised of a metallic ball and four conductive elements as shown in FIGS. 4 through 8.

Namely, as shown in FIG. 9, the inclinometer 50 consists of a first switch SW1 comprised of the first and third conductive elements 51, 53, a second switch SW2 comprised of the first and second conductive elements 51, 52, a third switch SW3 comprised of the second and fourth conductive elements 52, 54, and a fourth switch SW4 comprised of the third and fourth conductive elements 53, 54. Each of the four switches SW1–SW4 is individually closed (switched on) when the metallic ball 55 contacts the respective pair of conductive elements, and open (switched off) when the metallic ball 55 is apart from the conductive elements.

Figure 10:
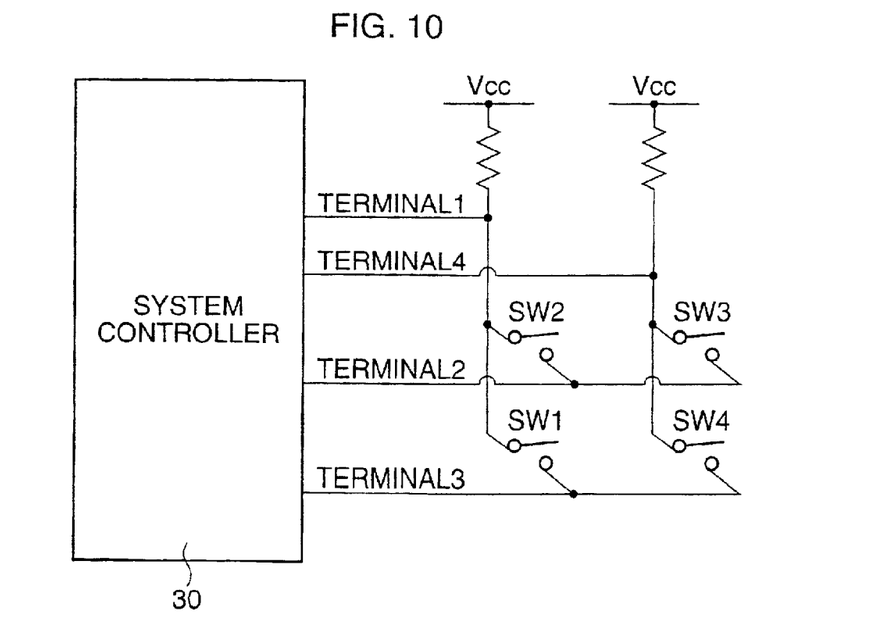
FIG. 10 illustrates the electrical interconnection between terminals of the system controller and the switches shown in FIG. 9.

The system controller 30 has four input/output terminals 1, 2, 3 and 4. The first conductive element 51 is connected with terminal 1, the second conductive element 52 with terminal 2, the third conductive element 53 with terminal 3, and the fourth conductive element 54 with terminal 4. FIG. 10 illustrates the connection between terminals 1–4 of the system controller 30 and the first through fourth switches SW1–SW4 of the inclinometer 50.

Figure 11:
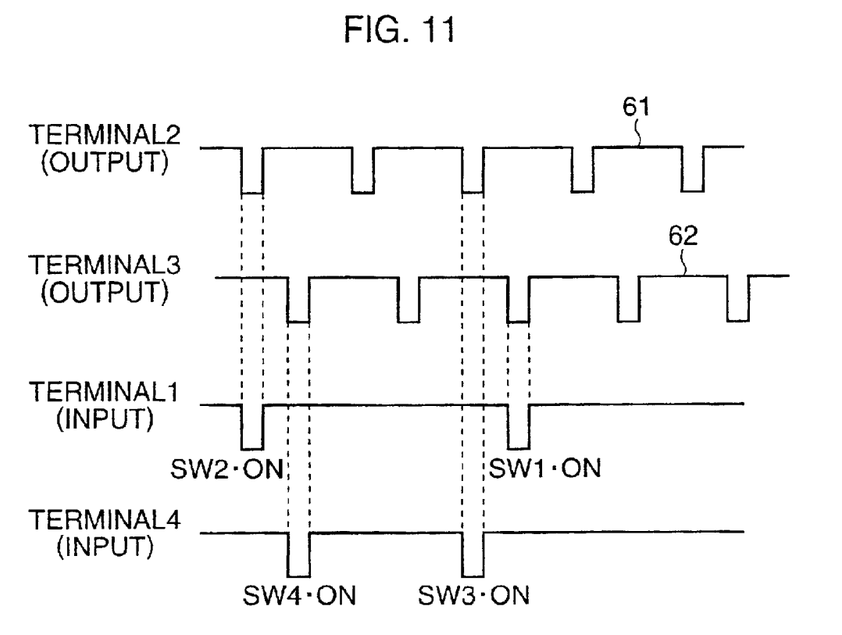
FIG. 11 is a timing chart of a sensing operation at the system controller for sensing the ON/OFF state of the switches in the inclinometer.

A timing chart shown in FIG. 11 indicates an example of a sensing operation at the system controller 30 that senses the ON/OFF state of each switch SW1–SW4 in the inclinometer 50. In this example, the system controller 30 regularly feeds a first pulse signal 61 from terminal 2 to the second conductive element 52, and simultaneously feeds a second pulse signal 62 from terminal 3 to the third conductive element 53. Due to the connection between the switches SW1–SW4 and terminals 1–4, as described in FIG. 10, the first pulse signal 61 from terminal 2 is fed to terminal 1 when the switch SW2 is ON, and when the switch SW3 is ON, it is fed to terminal 4. Further, the second pulse signal 62 from terminal 3 is fed to terminal 1 when the switch SW1 is ON, and when the switch SW4 is ON, it is fed to terminal 4.

Therefore, the system controller 30 monitors both input signals from terminals 1 and 4. When the system controller detects the first pulse signal 61 applied to terminal 2, in terminal 1, it determines that the switch SW2, which corresponds to the upside-down position, is ON. When the system controller 30 detects the first pulse signal 61 applied to terminal 2, in terminal 4, it determines that the switch SW3, which corresponds to the first longitudinal position, is ON. When the system controller 30 detects the second pulse signal 62 applied to terminal 3, in terminal 1, it determines that the switch SW1, which corresponds to the second longitudinal position, is ON. When the system controller 30 detects the second pulse signal 62 applied to terminal 3, in terminal 4, it determines that the switch SW4, which corresponds to the regular lateral position, is ON.

Figure 12:
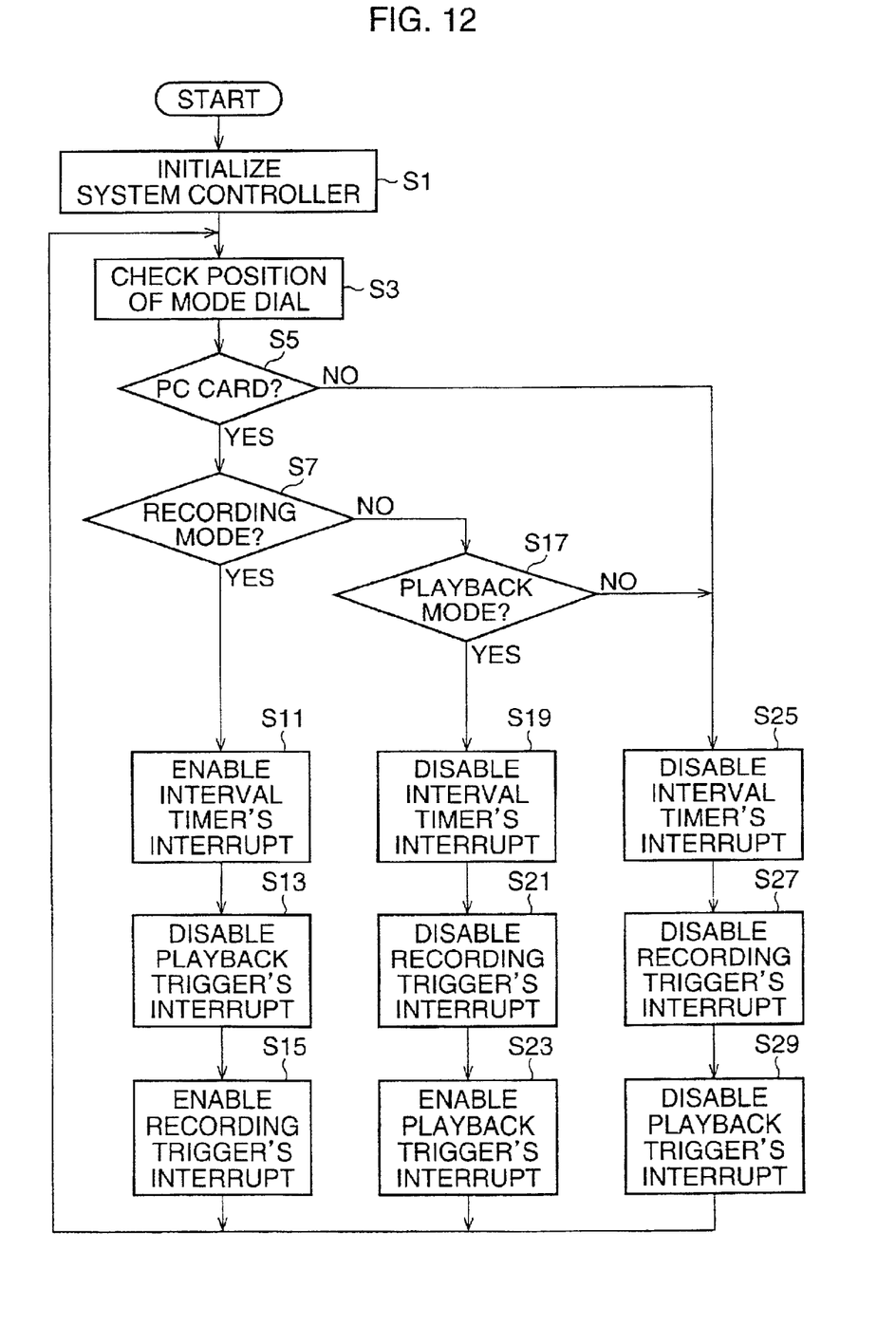
FIG. 12 is a flowchart of the control routine, which relates to the present embodiment, and is executed in the digital camera.

FIG. 12 is a flowchart of a control process, relating to the present invention, which is executed by the system controller 30. This control process starts when the power switch of the camera 10 is switched on. First of all, the system controller is initialized, and counters C1 through C4, the operation of which are described hereinafter, are reset (Step S1). Subsequently, the selection of the mode dial 22 is checked (Step S3). Then, a determination is made as to whether the PC card 39 is set or not. When it is determined that the PC card 39 is set, the recording mode selection is checked (Step S5, S7). Contrarily, when the PC card 39 is not set, the control proceeds to Step S25.

When the recording mode is selected, an interrupt caused by an interval timer is enabled (Step S11). Further, an interrupt caused by a playback trigger is disabled and an interrupt caused by a recording trigger is enabled (Step S13 and S15). Subsequently, the control routine returns to Step S3. NOTE: the interrupt, playback triggers and recording triggers are described hereinafter. On the other hand, at Step S7, when it is determined that the recording mode is not selected, a determination is made as to whether the playback mode is selected (Step S17).

If the playback mode is selected, interrupt caused by the interval timer is disabled (Step S19). And then, interrupt caused by the recording trigger is disabled and interrupt caused by the playback trigger is enabled (Step S21 and S23). Subsequently, the control returns to Step S3. On the other hand, at Step S17, when it is determined that the playback mode is not selected, interrupt caused by the interval timer, recording trigger and playback trigger is disabled (Step S25, S27 and S29), and the control routine returns to Step S3.

Figure 13:
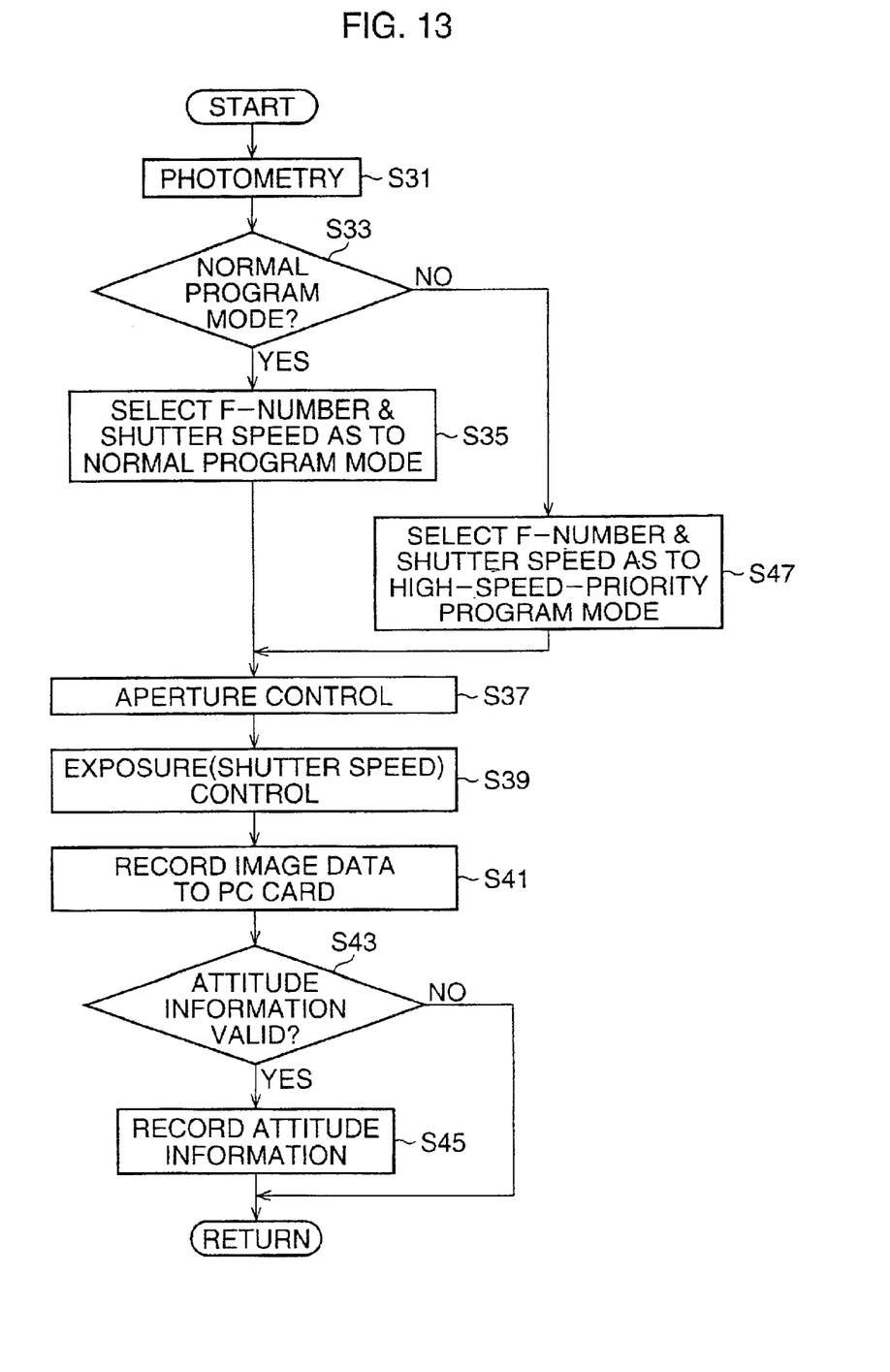
FIG. 13 is a flowchart of the control routine in a recording mode.

FIG. 13 is a flowchart of a control routine process (an interrupt handling) in the recording mode. This control routine process starts when the release switch 32 is switched on (which corresponds to a recording trigger), when the release button 16 is depressed, while the recording mode is selected. The control routine begins with photometry by the photometric sensor 31, and then a determination is made as to whether or not the normal program mode is selected (Step S31 and S33). When the normal program mode is selected, combination of f-number and shutter speed is selected in accordance with the programmed AE line for the normal program mode, as indicated by the broken line A in FIG. 2 (Step S35). And then, the aperture and exposure (shutter speed) are controlled in accordance with the selected combination (Step S37 and S39), so that a subject image is formed on the surface of the CCD 34 and is converted to image data.

The image data obtained by the above process is recorded by the memory provided in the PC card 39 (Step S41). Subsequently, validity of the attitude information for the camera body 12, which is sensed by the inclinometer 50 during an image capturing operation, is checked (Step S43). If the attitude information is valid, the attitude information is recorded in the memory of the PC card 39, together with the data of the captured image (Step S45). This interrupt handling then ends and the control returns to the main routine. If the attitude information is invalid, this interrupt handling ends immediately, and the control returns to the main routine without executing Step S45.

When it is determined at Step S33 that the normal program mode is not selected, a combination of f-number and shutter speed is selected in accordance with the programmed AE line of the high-shutter-speed priority program mode which is indicated by the solid line B in FIG. 2 (Step S47). The control then reverts to Step S37 and the process continues as previously described i.e., the aperture and exposure (shutter speed) are controlled in accordance with the selected combination (Step S37 and S39), so that a subject image formed on the surface of the CCD 34 is converted to image data, and the Steps 41–45, as described above, are then executed.

Figure 14:
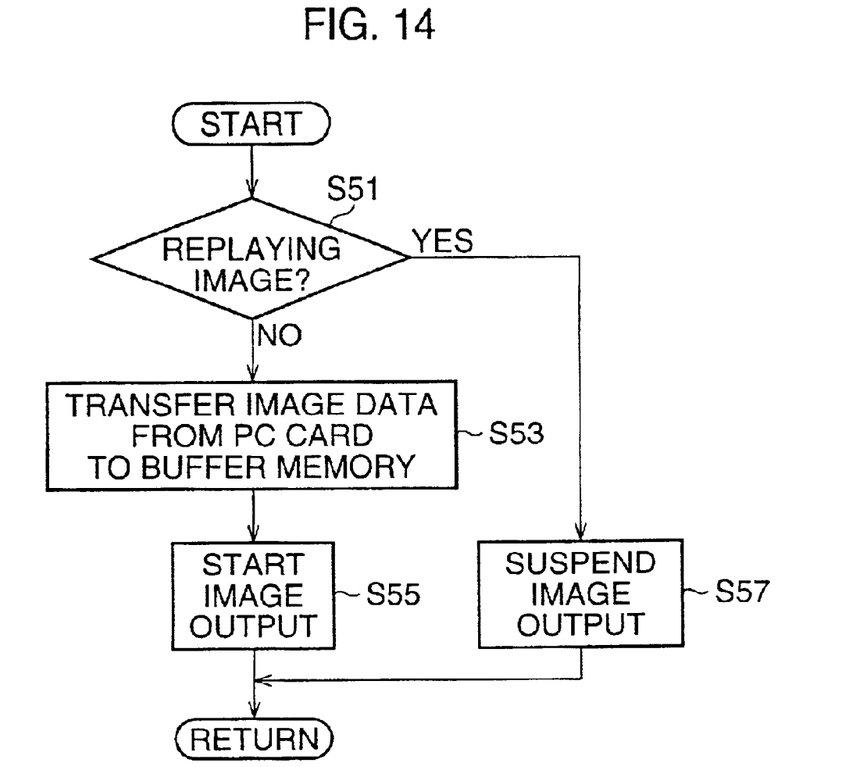
FIG. 14 is a flowchart of the control routine in a playback mode.

FIG. 14 is a flowchart of a control routine process (an interrupt handling) in the playback mode. This control process starts when the release switch 32 is switched on (which corresponds to a playback trigger) by the operation of the release button 16, when the playback mode is selected. First of all, a check is made to see whether a recorded image is being displayed on the LCD monitor 18 (Step S51). If no image is currently being replayed on the LCD monitor 18, image data recorded in the PC card 39 is transferred to the buffer memory 40 (Step S53), and the transferred image data is fed to the LCD monitor 18, so that the reproduced or playback image is displayed on the LCD monitor 18 (Step S55). The control process in this interrupt handling then returns to the main routine. Contrarily, when it is determined at Step S51 that a recorded image is reproduced and currently being replayed on the LCD monitor 18, output of image data to the LCD monitor 18 is suspended (Step S57).

Figure 15:
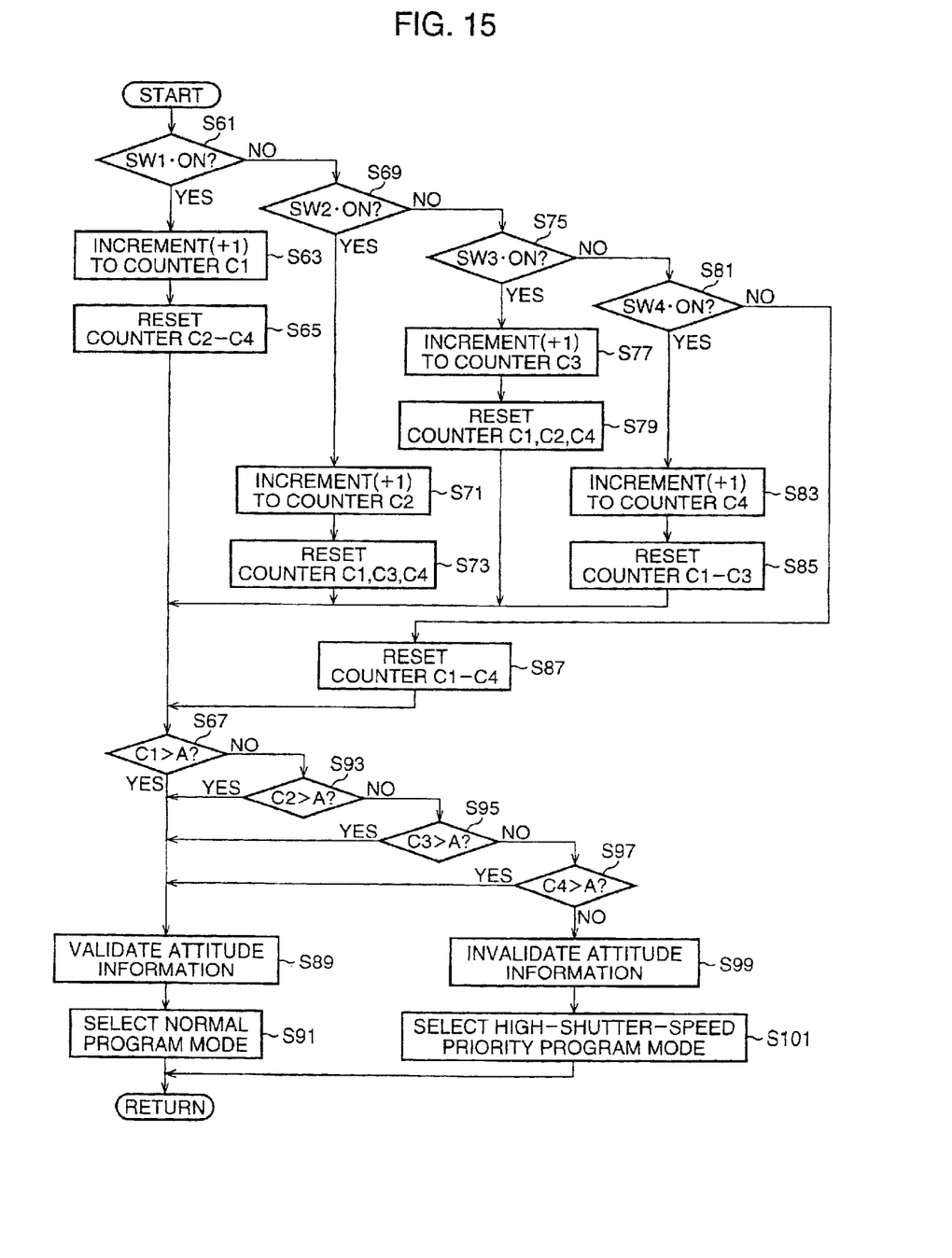
FIG. 15 is a flowchart of the control routine when the automatic exposure mode is selected.

FIG. 15 is a flowchart of a control routine in the AE mode which may be comprised of a normal and high-speed-shutter program mode. This routine is an interrupt handling by the interval timer, and it is periodically repeated while the AE mode is selected.

In the control-flow including this routine, signals from the inclinometer 50 are cyclically checked at a predetermined period while the AE mode is selected. If the signals from the inclinometer 50 are stable, the normal program mode is selected and the exposure is controlled by the normal program mode. On the other hand, if the output from the inclinometer 50 is unstable, the high-speed-shutter program mode is selected and the exposure is controlled by the high-speed-shutter program mode. Although the attitude (the lateral or longitudinal position) of the camera body 10 is generally fixed, the metallic ball 55 in the inclinometer 50 moves about with camera movement. This situation occurs when the camera is operated in a moving car for example, and the image is blurred. When the camera or inclinometer 50 is shaken, the metallic ball 55 bounds about the space within the inclinometer 50 and one of the first through fourth switches SW1–SW4 is alternately switched between the ON and OFF states. When alternation between the ON and OFF states is repeated rapidly, the attitude information is invalidated and treated as void.

The inclinometer 50, which uses contact of a conductive or metallic ball between conductive elements, is originally utilized for detecting the attitude of the camera. However the inclinometer 50 can also be utilized to determine camera-shake by detecting rapid alternate switching between the ON and OFF states, by one of the first to fourth switches SW1–SW4. Therefore, in a camera 10 to which an embodiment of the present invention is applied, the inclinometer 50 is utilized not only for detecting the attitude of the camera but also for detecting camera-shake. When the detected camera-shake exceeds a predetermined rapidity, the high-shutter-speed priority program mode is selected and the automatic exposure mechanism is controlled by the high-shutter-speed priority program, so that blurring of the photographed image is prevented.

Selection between the normal program mode or the high-shutter-speed program mode is described as follows with reference to FIG. 15.

Firstly, whether the first switch SW1 is ON or not, is checked (Step S61). If the first switch SW1 is ON, the counter C1 is incremented by one (Step S63), and each counter C2, C3 and C4 is reset (Step S65). The control then proceeds to Step S67.

If it is determined at Step S61 that the first switch SW1 of the inclinometer 50 is OFF, whether the second switch SW2 is ON, is checked at Step S69. If the second switch SW2 is ON, the counter C2 is incremented by one, and each counter C1, C3 and C4 is reset (Step S69, S71 and S73) and the control proceeds to Step 67.

If it is determined at Step S69 that the second switch SW2 of the inclinometer 50 is OFF, whether the third switch SW3 is ON, is checked at Step S75. If the third switch SW3 is ON, the counter C3 is incremented by one, and each counter C1, C2 and C4 is reset (Step S75, S77 and S79). Subsequently, the control proceeds to Step 67.

If it is determined at Step S75 that the third switch SW3 of the inclinometer 50 is OFF, whether the fourth switch SW4 is ON, is checked at Step S81. If the fourth switch SW4 is ON, the counter C4 is incremented by one, and each counter C1, C2 and C3 is reset (Step S81, S83 and S85) and the control proceeds to Step 67. If it is determined at Step 81 that the fourth switch SW4 of the inclinometer 50 is OFF, namely, when every first to fourth switch SW1–SW4 is OFF, each of the counters C1, C2, C3 and C4 is reset concurrently (Step 81 and 87), and the control proceeds to Step S67.

At Step S67, a determination is made as to whether the counter C1 exceeds a predetermined value A (e.g. A=3). If the counter C1 exceeds the predetermined value A (i.e. when C1 is 4 or more when A=3), the attitude information of the camera body 12, which is sensed by the inclinometer 50 while photographing, is validated and the sub-mode of the AE mode is set to the normal program mode (Step S89 and S91). The control process in this interrupt handling then ends and returns to the main routine.

When it is determined at S67 that the counter C1 is below the predetermined value A, a determination is then made as to whether the counter C2 exceeds the predetermined value A (Step S93). If the counter C2 exceeds the predetermined value A, the attitude information of the camera body 12, which is sensed by the inclinometer 50 while photographing, is validated and the sub-mode of the AE mode is set to the normal program mode (Step S93, S89 and S91). The control of this interrupt handling then ends and returns to the main routine.

When it is determined at S93 that the counter C2 is below the predetermined value A, a determination is then made as to whether the counter C3 exceeds the predetermined value A (Step S95). If the counter C3 exceeds the predetermined value A, the attitude information of the camera body 12, which is sensed by the inclinometer 50 while photographing, is validated and the sub-mode of the AE mode is set to the normal program mode (Step S95, S89 and S91). The control in this interrupt handling then ends and returns to the main routine.

When it is determined at S95 that the counter C3 is below the predetermined value A, a determination is then made as to whether the counter C4 exceeds the predetermined value A (Step S95 and S97). If the counter C4 exceeds the predetermined value A, the attitude information of the camera body 12, which is sensed by the inclinometer 50 while photographing, is validated and the sub-mode of the AE mode is set to the normal program mode (Step S97, S89 and S91). The control in this interrupt handling then ends and returns to the main routine.

When it is determined at S97 that the counter C4 is below the predetermined value A, namely, when every counter C1–C4 is below the predetermined value A, the attitude information of the camera body 12, which is sensed by the inclinometer 50 while photographing, is invalidated and the sub-mode of the AE mode is set to the high-shutter-speed priority program mode (Step S97, S99 and S101). The control in this interrupt handling then ends and returns to the main routine.

As described above, at Step S67, S93, S95 and S97, it is determined whether any of the counters C1 through C4 exceed the predetermined value A. The control-flow shown in FIG. 15 is repeated at a predetermined period, thus if one of the counters C1–C4 exceed the predetermined value A, it can be determined that the metallic ball 55 has kept one of the switches SW1–SW4 in an ON state for a certain period. Consequently, it can be regarded that camera-shake did not exceed a predetermined value for the above certain period. Namely, if one of the counters C1–C4 exceed the predetermined value A, it is determined that the camera has been stable for the above certain period, which is defined by the predetermined value A, and the normal program mode is selected as the sub-mode of the AE mode. Contrarily, if none of the counters C1–C4 exceed the predetermined value A, it is then determined that the camera is unstable (namely, the camera 10 is shaking), and the high-shutter-speed priority program mode is selected as the sub-mode of the AE mode. Consequently, image blur is prevented.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-023522 (filed on Feb. 1, 2000) which is expressly incorporated herein, by reference, in their entireties.

What is claimed is:

1. A digital camera comprising:

an automatic exposure control mechanism that operates in an automatic exposure mode which comprises at least two sub-modes including a normal program mode and a high-shutter-speed priority program mode, wherein said high-shutter-speed priority program mode selects a higher shutter speed in comparison with said normal program mode under a same photographing condition;

a camera attitude sensing processor that senses an attitude of said camera with respect to the vertical;

a camera-shake detecting processor that detects a camera-shake in accordance with a stability of said attitude, sensed by said camera attitude sensing processor;

a selecting control processor that selects said high-shutter-speed priority program mode as said sub-mode, when said attitude, sensed by said camera attitude sensing processor, is unstable and said camera-shake is detected by said camera-shake detecting processor while said automatic exposure mode is performed;

wherein said camera attitude sensing processor comprises an inclinometer, and said selecting control processor repeatedly checks output from said inclinometer at a predetermined period and invalidates attitude information about said attitude detected while photographing if said output corresponding to said attitude is unstable while said automatic exposure mode is performed.

2. A camera according to claim 1 that comprises a recording processor which records in a recording medium, said attitude information about said attitude detected while photographing, together with image data corresponding to an image taken during said photographing and wherein said selecting control processor invalidates said attitude information when said attitude, sensed by said camera attitude sensing processor, is unstable and said camera-shake is detected by said camera-shake detecting processor while said automatic exposure mode is performed.

3. A camera according to claim 1, wherein said selecting control processor selects said normal program mode as said sub-mode, when said attitude sensed by said camera attitude sensing processor is stable and said camera-shake is not detected, while said automatic exposure mode is performed.

4. A camera according to claim 1, wherein said selecting control processor switches selection of said sub-mode from said high-shutter-speed priority program mode to said normal program mode when status of said attitude sensed by said camera attitude sensing processor changes from unstable to stable and said camera-shake is no longer detected, while said automatic exposure mode is performed.

5. A digital camera comprising:

an automatic exposure control mechanism that operates in an automatic exposure mode which comprises at least two sub-modes including a normal program mode and a high-shutter-speed priority program mode, wherein said high-shutter-speed priority program mode selects a higher shutter speed in comparison with said normal program mode under a same photographing condition;

a camera attitude sensing processor that senses an attitude of said camera with respect to the vertical;

a camera-shake detecting processor that detects a camera-shake in accordance with a stability of said attitude, sensed by said camera attitude sensing processor;

a selecting control processor that selects said high-shutter-speed priority program mode as said sub-mode, when said attitude, sensed by said camera attitude sensing processor, is unstable and said camera-shake is detected by said camera-shake detecting processor while said automatic exposure mode is performed; and a recording processor which records in a recording medium, attitude information about said attitude detected while photographing, together with image data corresponding to an image taken during said photographing and wherein said selecting control processor invalidates said attitude information when said attitude, sensed by said camera attitude sensing processor, is unstable and said camera-shake is detected by said camera-shake detecting processor while said automatic exposure mode is performed.

* * * * *